(12) United States Patent
Takenaka

(10) Patent No.: US 12,385,167 B2
(45) Date of Patent: Aug. 12, 2025

(54) STRAND WITH A SPIRAL GROOVE

(71) Applicant: KOBE STEEL, LTD., Hyogo (JP)

(72) Inventor: Makoto Takenaka, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 18/250,310

(22) PCT Filed: Oct. 29, 2021

(86) PCT No.: PCT/JP2021/040175
§ 371 (c)(1),
(2) Date: Apr. 24, 2023

(87) PCT Pub. No.: WO2022/097590
PCT Pub. Date: May 12, 2022

(65) Prior Publication Data
US 2023/0392303 A1 Dec. 7, 2023

(30) Foreign Application Priority Data

Nov. 6, 2020 (JP) ................................. 2020-185914
Sep. 10, 2021 (JP) ................................. 2021-148158

(51) Int. Cl.
*D02G 3/44* (2006.01)
*D02G 3/26* (2006.01)

(52) U.S. Cl.
CPC ............... *D02G 3/447* (2013.01); *D02G 3/26* (2013.01)

(58) Field of Classification Search
CPC ................................ D02G 3/447; D07B 5/006
See application file for complete search history.

(56) References Cited

U.S. PATENT DOCUMENTS

| 1,003,597 | A | * | 9/1911 | Gore | ...................... | D07B 1/167 |
| | | | | | | 57/220 |
| 1,055,326 | A | * | 3/1913 | Gore | ...................... | D07B 1/167 |
| | | | | | | 57/220 |
| 1,405,838 | A | * | 2/1922 | Green | ...................... | D07B 1/14 |
| | | | | | | 57/220 |
| 1,916,135 | A | * | 6/1933 | Gates | ................... | D07B 1/0686 |
| | | | | | | 57/220 |
| 3,023,483 | A | * | 3/1962 | Steiner | ................... | D07B 5/006 |
| | | | | | | 428/397 |
| 3,686,750 | A | * | 8/1972 | Woolcock | .......... | H10N 60/0128 |
| | | | | | | 505/928 |

(Continued)

FOREIGN PATENT DOCUMENTS

| JP | 2019-123241 A | 7/2019 |
| WO | 2015/009938 A1 | 1/2015 |

(Continued)

OTHER PUBLICATIONS

International Search Report issued in PCT/JP2021/040175; mailed Dec. 7, 2021.

(Continued)

*Primary Examiner* — Bao-Thieu L Nguyen
(74) *Attorney, Agent, or Firm* — Studebaker Brackett PLLC

(57) ABSTRACT

A strand, which is a resin strand used as an additive manufacturing raw material for a 3D printer and formed in a linear shape, the strand having a spiral groove portion formed on an outer peripheral surface along an axial direction.

10 Claims, 10 Drawing Sheets

(56) References Cited

U.S. PATENT DOCUMENTS

| | | | | | |
|---|---|---|---|---|---|
| 3,763,552 | A | * | 10/1973 | Brown | H10N 60/0184 |
| | | | | | 505/928 |
| 4,101,731 | A | * | 7/1978 | Marancik | H10N 60/20 |
| | | | | | 427/63 |
| 4,156,443 | A | * | 5/1979 | Nishikawa | B65D 63/10 |
| | | | | | 140/101 |
| 4,826,279 | A | * | 5/1989 | Nishimura | G02B 6/4407 |
| | | | | | 385/102 |
| 5,517,591 | A | * | 5/1996 | Wagman | G02B 6/4408 |
| | | | | | 385/105 |
| 5,683,642 | A | * | 11/1997 | Muguruma | D07B 1/0693 |
| | | | | | 264/45.9 |
| 6,512,870 | B1 | * | 1/2003 | Ciciriello | H02G 1/14 |
| | | | | | 385/105 |
| 6,779,950 | B1 | * | 8/2004 | Hutchins | E21D 21/0026 |
| | | | | | 57/212 |
| 11,718,015 | B2 | * | 8/2023 | Takenaka | B29B 15/122 |
| | | | | | 264/239 |
| 2015/0000242 | A1 | * | 1/2015 | Nater | D07B 5/00 |
| | | | | | 57/9 |
| 2020/0317867 | A1 | | 10/2020 | Hara et al. | |
| 2020/0324462 | A1 | | 10/2020 | Newell | |
| 2022/0220641 | A1 | | 7/2022 | Hagihara | |

FOREIGN PATENT DOCUMENTS

| | | |
|---|---|---|
| WO | 2018/003379 A1 | 1/2018 |
| WO | 2020/241615 A1 | 12/2020 |

OTHER PUBLICATIONS

Written Opinion of the International Searching Authority issued in PCT/JP2021/040175; mailed Dec. 7, 2021.

* cited by examiner

STRAND WITH A SPIRAL GROOVE

TECHNICAL FIELD

The present invention relates to a strand.

BACKGROUND ART

As an apparatus for molding an object having a three-dimensional shape, a three-dimensional (3D) printer, which employs fused deposition modeling in which a resin plasticized by heat is laminated one by one, has been known. The 3D printer can manufacture a three-dimensional object without requiring a gold mold, a jig, or the like. In addition, the 3D printer can manufacture a three-dimensional object which is difficult to mold by an injection molding technique.

As shown in FIG. 12, in a 3D printer, a linear resin strand (filament) 203 wound around a spool 201 is continuously fed to a nozzle 207 through a tube 205, and the strand 203 is plasticized by heat of a heater and discharged from the nozzle 207 to be laminated on a base 209 (see, for example, Patent Literature 1).

CITATION LIST

Patent Literature

Patent Literature 1: JP2019-123241A

SUMMARY OF INVENTION

Technical Problem

In the above 3D printer, in a case where a supply path of the strand 203 fed from the spool 201 to the nozzle 207 has a bending portion K, a bending force is applied to the strand 203 at the bending portion K, and the strand 203 may be cracked or damaged.

Therefore, an object of the present invention is to provide a resin strand having excellent bendability so that the manufacturing using a 3D printer can be smoothly performed.

Solution to Problem

The present invention has the following configuration.

A strand, which is a resin strand used as an additive manufacturing raw material for a 3D printer and formed in a linear shape, the strand including a spiral groove portion formed on an outer peripheral surface along an axial direction.

Advantageous Effects of Invention

According to the present invention, it is possible to provide a resin strand having excellent bendability so that the manufacturing using a 3D printer can be smoothly performed.

DESCRIPTION OF EMBODIMENTS

Hereinafter, embodiments of the present invention will be described in detail with reference to the drawings.

(Strand)

Figure 1A:
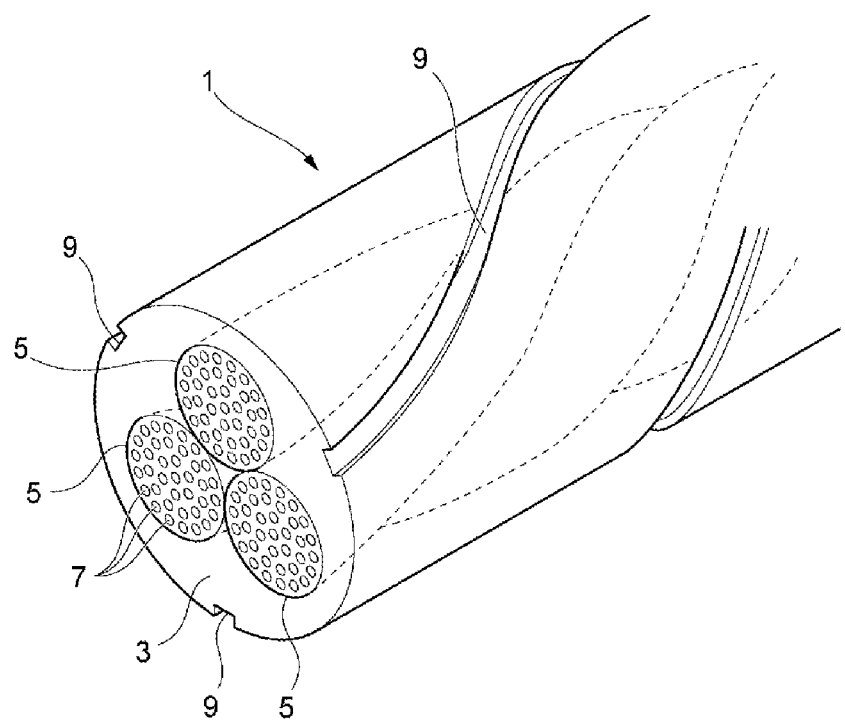
FIG. 1A is a perspective view of a strand according to the present embodiment.
Figure 1B:
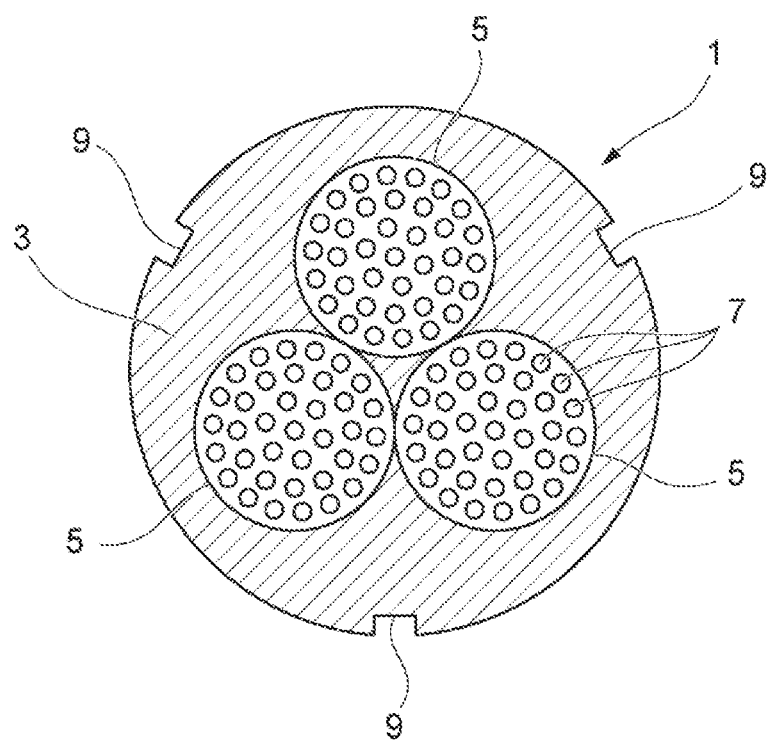
FIG. 1B is a cross-sectional view of the strand according to the present embodiment, the cross-section view being taken along a plane perpendicular to a longitudinal direction.

FIG. 1A is a perspective view of a strand according to the present embodiment, and FIG. 1B is a cross-sectional view of the strand according to the present embodiment taken along a plane perpendicular to a longitudinal direction.

As shown in FIGS. 1A and 1B, a strand 1 according to the present embodiment is a linear resin material used as an additive manufacturing raw material for a 3D printer. The strand 1 includes a base material 3 containing a thermoplastic resin as a main component, and fiber bundles 5 impregnated with the base material 3 and continuously extending in an axial direction. The fiber bundles 5 are each made by the bundling fibers 7, and are disposed at a center of the strand 1 in a state of being twisted together. In this example, three fiber bundles 5 are provided, and the three fiber bundles 5 are twisted together. An outer periphery of the base material 3 and thus the outer peripheral surface of the strand 1, excluding the part that is groove portions 9 described later, are formed in a substantially circular shape in a cross section perpendicular to the longitudinal direction (axial direction) of the strand 1.

The strand 1 has groove portions 9 (three in this example) on the outer peripheral surface thereof. These groove portions 9 are spirally formed along the axial direction. It is preferable that the groove portions 9 are formed at equal intervals in a circumferential direction in the cross section perpendicular to the axial direction, and directions of the spirals and pitches P of the spirals are the same. The pitch P of the spiral of the groove portion 9 is preferably 0.001 mm to 500 mm. The pitch P is particularly preferably 0.005 mm to 100 mm. Further, the width dimension Wa of the groove portion 9 is preferably 0.001 mm to 10 mm, and particularly preferably 0.005 mm to 5 mm. The depth dimension H of the groove portion 9 is preferably 0.001 mm to 10 mm, and particularly preferably 0.005 mm to 1 mm.

The diameter d of the strand 1 is about 0.1 mm to 10 mm, and a ratio (P/d) of the pitch P to the diameter d is preferably 0.0001 to 5,000, more preferably 0.001 to 500, and particularly preferably 0.01 to 50. Further, a ratio (P/Wa) of the pitch P to the width dimension Wa of the groove portion 9 is preferably 0.0001 to 500,000, more preferably 0.01 to 50,000, and particularly preferably 0.1 to 5,000. Within the above range, the bendability of the strand 1, which is described later, can be improved.

A 3D printer using the strand 1 employs a so-called fused deposition modeling in which the strand 1 whose thermoplastic resin component is melted by heat is stacked little by little to form a three-dimensional object. In the fused deposition modeling, manufacturing is performed while adhering a previously formed layer and a next layer one by one in a semi-solid (softened) state. The 3D printer is not particularly limited as long as a manufactured object can be formed by stacking a resin plasticized by heat little by little. Examples of the 3D printer include a 3D printer including a support plate that is freely movable in the up-down, left-right, and front-rear directions, and a supply unit that supplies the thermoplastic resin component of the strand 1 to the support plate while plasticizing the thermoplastic resin component.

As the fiber bundles 5 constituting the strand 1, organic fibers such as a polyethylene fiber, an aramid fiber, and a xyron fiber, and inorganic fibers such as a boron fiber, a glass fiber, a carbon fiber, a metal fiber, and a rock fiber can be used. As the reinforcing fiber, a fiber that has been subjected to a surface treatment can be used in order to improve the adhesion strength between the resin and the fiber.

As the thermoplastic resin that is a main component of the base material 3, polyolefin-based resins such as polypropylene or polyethylene, acrylonitrile-butadiene-styrene resins, polystyrene resins, polyester-based resins such as polyethylene terephthalate, polybutylene terephthalate, or polylactic acid, polyamide-based resins, aromatic polyamide-based resins, polyetherimide, polyarylimide, polyarylate, polyether ether ketone, polyaryletherketone, polybenzimidazole, polyethersulfone, polysulfone, polyvinylidene fluoride resins, liquid crystal polymers, polycarbonate resins, polyacetal, polyphenylene sulfide and the like can be used.

These thermoplastic resins may be used alone, and a thermoplastic resin in which a plurality of these resins is blended may be used in order to improve heat resistance, heat distortion temperature, heat aging resistance, tensile properties, bending properties, creep properties, compression properties, fatigue properties, impact properties, and sliding properties of the thermoplastic resin part. Examples thereof include PEEK/PTFE, PEEK/PBI, and the like. Further, a resin obtained by adding short fibers such as carbon fibers and glass fibers, or talc to a resin can be used.

By adding phenolic antioxidants, thioether-based antioxidants, or phosphite-based antioxidants, benzotriazole-based ultraviolet absorbers or triazine-based ultraviolet absorbers, hydrazide-based metal deactivating agents or amide-based metal deactivating agents, or the like to the thermoplastic resin, the durability of the manufactured object can be improved.

By adding a phthalic acid-based plasticizer or polyester-based plasticizer, the flexibility of the thermoplastic resin can be improved, and the manufacturing accuracy during manufacturing and the flexibility of the manufactured object can be improved.

By adding a halogen-based flame retardant, phosphoric acid ester-based flame retardant, inorganic flame retardant, or intumescent flame retardant to the thermoplastic resin, the flame retardancy of the manufactured object can be improved.

By adding a phosphoric acid ester metal salt-based core material or sorbitol-based core material to the thermoplastic resin, the thermal expansion during the manufacturing can be controlled, and the manufacturing accuracy can be improved.

By adding a non-ionic-based permanent antistatic agent, anionic-based permanent antistatic agent, and cationic-based permanent antistatic agent to the thermoplastic resin, the antistatic property of the manufactured object can be improved.

By adding a hydrocarbon-based lubricant or metal soap-based lubricant to the thermoplastic resin to improve the slidability of the continuous fiber reinforced strand, the strand can be smoothly supplied during the manufacturing.

In a 3D printer for forming a manufactured object using a linear resin strand, the strand is fed from a spool toward a nozzle when forming the manufactured object. At this time, in a case where a supply path of the strand has a bent portion, a bending force is applied to the strand at the bent portion, and the strand may be cracked or damaged.

In recent years, in order to improve the mechanical strength of a manufactured object, a method for manufacturing fiber reinforced plastics (FRP) with a fused deposition modeling (FDM) 3D printer using a continuous fiber reinforced strand reinforced by fibers has been proposed, and the use thereof has been expanded. However, when a manufactured object is formed using an existing continuous fiber reinforced strand, internal fibers may be peeled off at a location where the curvature is large (the curvature radius is small) since the bendability of the continuous fiber reinforced strand is low. Then, a difference occurs between a design path and a path during the actual manufacturing, and as a result, the manufacturing accuracy of the manufactured object may deteriorate, and voids may be generated in the manufactured object to cause deterioration in quality. The deterioration in the manufacturing accuracy and quality tends to occur remarkably in a case where a strand having a large diameter is used.

In contrast, according to the strand 1 of the present embodiment, the spiral groove portion 9 is formed on the outer peripheral surface along the axial direction, so that the front surface area of the outer peripheral surface can be increased, and the bendability can be improved. Accordingly, when the strand 1 is fed from the spool to the nozzle in the 3D printer, even if a bending force is applied to the strand 1 at the bent portion since the supply path has the bent portion, the strand 1 can be fed along the bent supply path without being cracked or damaged. Therefore, the manufacturing using the 3D printer can be smoothly performed. In addition, the strand can be easily wound around the spool without being cracked or damaged.

Moreover, spiral groove portions 9 are formed, so that the bendability can be further improved. In addition, the groove portions 9 are formed at equal intervals in the circumferential direction in the cross section perpendicular to the axial direction of the strand 1, and the spirals of the groove portions 9 are in the same direction and at the same pitch. Therefore, bendability can be improved in all directions in a balanced manner. The crack or damage of the strand in the bent portion can be avoided without considering the position of the groove portion 9 in the strand 1 and a bending direction of the bent portion of the supply path.

In addition, the strength of the strand 1 can be significantly increased by the fiber bundle 5 formed by bundling the fibers 7, but the strand 1 is less likely to be bent due to the contained fiber bundle 5. However, good bendability can be ensured by the spiral groove portions 9 formed on the outer peripheral surface. By providing the spiral groove portions 9, manufacturing can be performed while favorably bending the strand 1, deterioration in manufacturing accuracy of the manufactured object and quality deterioration due to generation of voids in the manufactured object can be prevented, and a high-quality manufactured object can be formed, as subsidiary effects, even when a manufactured object is formed using the fused deposition modeling 3D printer.

Moreover, fiber bundles 5 obtained by bundling the fibers 7 are twisted together, so that the bendability of the fiber bundles 5 themselves can be enhanced, and the deterioration in the bendability due to the contained fiber bundles can be prevented.

(Production Apparatus)

Next, an example of a production apparatus for producing the strand 1 according to the present embodiment will be described.

Figure 2:
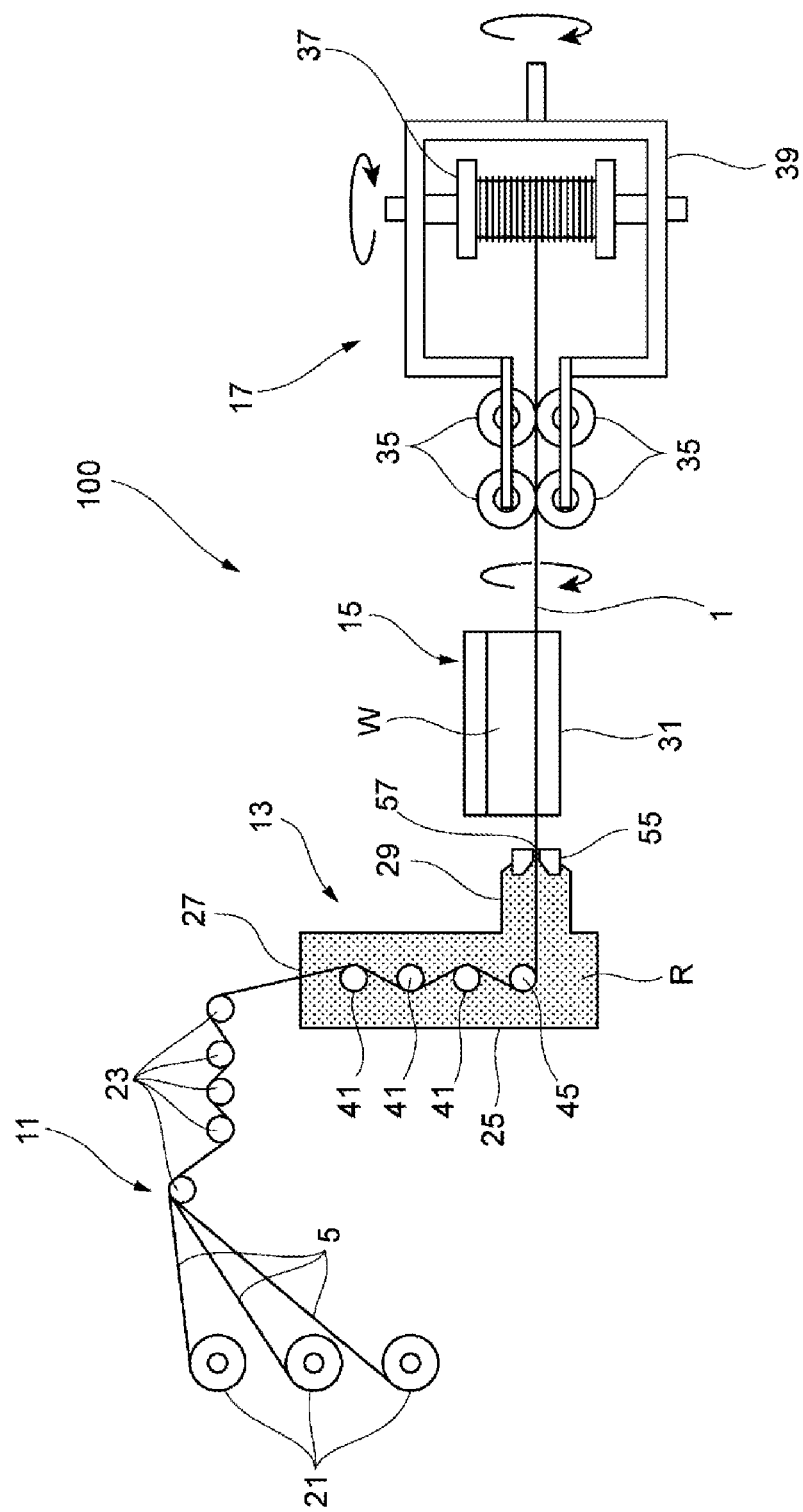
FIG. 2 is an overall configuration diagram of a production apparatus for producing the strand according to the present embodiment.

FIG. 2 is an overall configuration diagram of a production apparatus 100 for producing the strand 1 according to the present embodiment.

As shown in FIG. 2, the production apparatus 100 includes a fiber material supply unit 11, a resin bath unit 13, a cooling unit 15, and a twisting unit 17. In the production apparatus 100, the fiber bundle 5 fed out from the fiber material supply unit 11 is impregnated with a thermoplastic resin R serving as the base material 3 by the resin bath unit 13, and the thus-obtained product is drawn out as the strand 1. The strand 1 drawn out from the resin bath unit 13 is cooled by the cooling unit 15 while being rotated about an axis by the twisting unit 17, and is wound around the twisting unit 17.

The fiber material supply unit 11 includes spools 21 (three in this example) and guide rollers 23. The fiber bundles 5 are respectively wound around the spools 21, and the fiber bundles 5 are fed out from the spools 21. The fiber bundles 5 fed out from the respective spools 21 are aligned in a state of being spaced apart from each other by the guide roller 23, and are guided to the resin bath unit 13.

The resin bath unit 13 includes a cylindrical resin bathtub 25 extending upper and lower, and the thermoplastic resin R in a molten state is stored in the resin bathtub 25. The resin bathtub 25 is provided with a kneading extruder (not shown in the drawings) that melts a raw material of the introduced thermoplastic resin R and extrudes it into the resin bathtub 25, and the molten thermoplastic resin R is supplied from the kneading extruder. The resin bathtub 25 includes a fiber bundle introduction port 27 in an upper portion thereof, and the fiber bundles 5 are fed from the fiber bundle introduction port 27. The resin bathtub 25 further includes a strand drawing unit 29 on a side portion of a lower end thereof, and the strand 1 obtained by impregnating the fiber bundles 5 with the base material 3 is laterally drawn out from the strand drawing unit 29.

The resin bathtub 25 of the resin bath unit 13 is internally provided with impregnation rollers 41 and an introduction roller 45 which are supported in a manner of being rotatable about respective horizontal axes. The impregnation rollers 41 are provided along a vertical direction in the resin bathtub 25, and the introduction roller 45 is provided at a lower end in the resin bathtub 25.

Three fiber bundles 5 fed from the fiber bundle introduction port 27 of the resin bathtub 25 are alternately wound and in contact with the impregnation rollers 41. Accordingly, the fiber bundles 5 move in a meandering manner in the resin bathtub 25. The impregnation rollers 41 may not necessarily be rotatable. The fiber bundles 5 are wound around the introduction roller 45 at the lower end of the resin bathtub 25, and are guided to the strand drawing unit 29 by changing the moving tracks thereof from the vertical direction to a horizontal direction.

Figure 3:
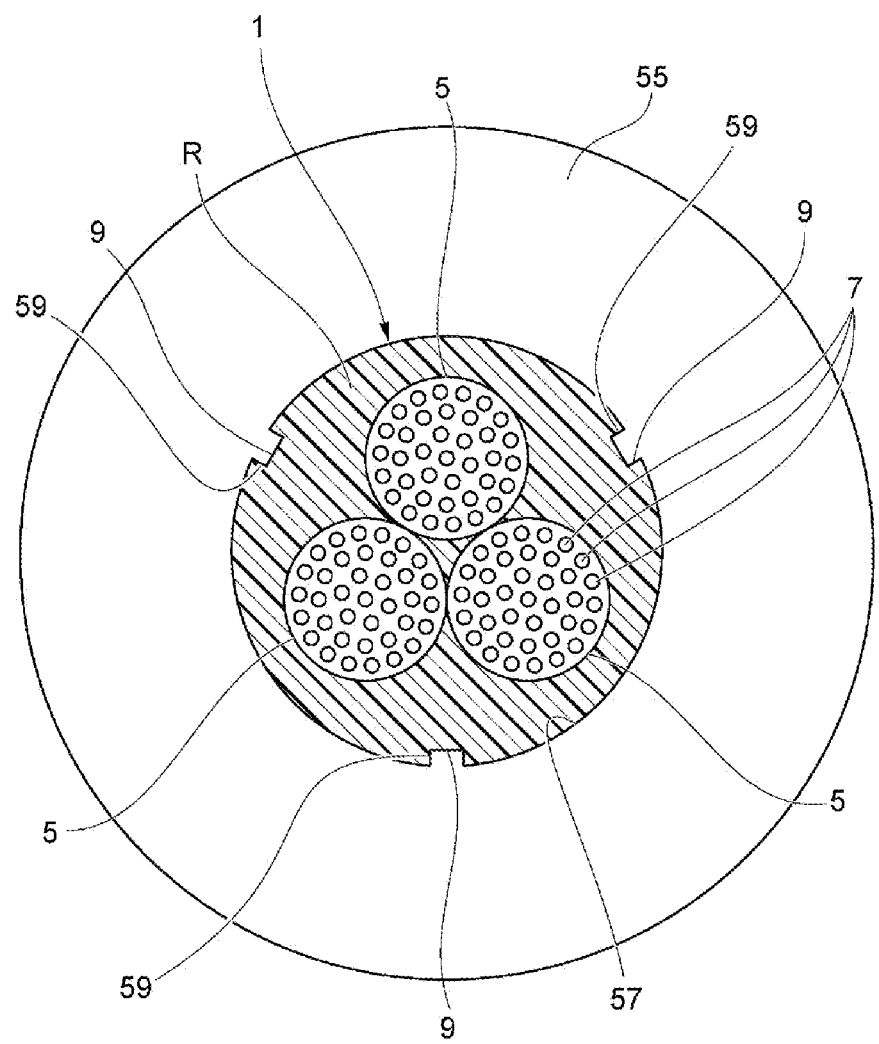
FIG. 3 is a front view of a die provided in a strand drawing unit of a resin bath unit constituting the production apparatus.

The strand drawing unit 29, from which the strand 1 obtained by impregnating the fiber bundles 5 with the base material 3 is drawn out, is provided with a die 55. The die 55 has a circular opening 57 which narrows toward a drawing-out direction of the strand 1. As shown in FIG. 3, an inner diameter of the opening 57 on a drawing-out direction side is formed in a size corresponding to an outer diameter of the strand 1 to be produced. The die 55 has the groove forming protrusions 59 (three in this example) protruding inward on an inner peripheral surface of the opening 57. These groove forming protrusions 59 are preferably formed at equal intervals in the circumferential direction in a cross section perpendicular to the drawing-out direction of the strand 1.

FIG. 3 shows an example in which the groove forming protrusions 59 of the die 55 are formed at equal intervals in the circumferential direction in the cross section perpendicular to the drawing-out direction of the strand 1, and the groove forming protrusions 59 are not necessarily formed at equal intervals. In a case where the groove forming protrusions 59 are not formed at equal intervals, the pitches of the groove portions 9 are not at equal intervals. However, since the groove portion 9 is formed, the bendability of the strand 1 can be improved as compared with a case where the groove portion 9 is not formed.

As described later, a die without the groove forming protrusions 59 may be used.

The cooling unit 15 includes a cooling tank 31 that is long along the drawing-out direction of the strand 1 drawn out from the strand drawing unit 29 of the resin bath unit 13. A cooling water W is stored inside the cooling tank 31 as a cooling medium. The strand 1 is drawn into the cooling tank 31 from the resin bath unit 13 side. The thermoplastic resin R serving as the base material 3 of the strand 1 drawn into the cooling tank 31 is cooled and cured by the cooling water W stored in the cooling tank 31. The strand 1 in which the thermoplastic resin R is cooled and cured by the cooling water W is drawn out from the twisting unit 17 side of the cooling tank 31.

The twisting unit 17 includes draw-in rollers 35, a winding bobbin 37, and a case 39. The draw-in rollers 35 are provided on a cooling unit 15 side of the case 39, and two pairs of the draw-in rollers 35 face each other. These draw-in rollers 35 draws the strand 1 from the cooling unit 15 into the case 39. The winding bobbin 37 is rotated about an axis perpendicular to an extending direction of the strand 1. Accordingly, the winding bobbin 37 winds up the strand 1 drawn into the case 39 by the draw-in rollers 35. The case 39 is rotated about an axis along the extending direction of the strand 1. Accordingly, the strand 1, which is drawn out from the resin bath unit 13, passes through the cooling unit 15, and is wound around the winding bobbin 37 of the twisting unit 17, is rotated around the axis, and a twist is imparted to the strand 1. As a unit for imparting a twist to the strand 1, various mechanisms can be adopted, and for example, a twisting unit for imparting a twist to the strand 1 by pulling the strand 1 by a pair of rollers that rotates in different rotation directions and feeding the strand 1 downstream may be used.

(Production Method)

Next, an example of a production method for producing the strand 1 by the production apparatus 100 will be described.

In the production apparatus 100, the strand 1 is produced by performing an impregnation step, a twisting step, a cooling step, and a winding step.

(1) Impregnation Step

The impregnation step is a step of impregnating the fiber bundles 5 with the thermoplastic resin R by the resin bath unit 13 of the production apparatus 100. In the impregnation step, the fiber bundles 5 fed out from the fiber material supply unit 11 and introduced from the fiber bundle introduction port 27 of the resin bath unit 13 passes through the resin bath unit 13, so that the fiber bundles 5 are impregnated with the molten thermoplastic resin R stored inside the resin bathtub 25.

Each of the fiber bundles 5 is alternately wound around impregnation rollers 41, and moves while being in contact with the outer peripheral surfaces of the impregnation rollers 41, and whereby the fibers 7 constituting each of the fiber bundles 5 are opened. Accordingly, the fiber bundle 5 are sufficiently impregnated between each fibers 7 with the thermoplastic resin R.

(2) Twisting Step

The twisting step is a step of twisting the fiber bundles 5 impregnated with the thermoplastic resin R. The fiber bundles 5 are wound around the introduction roller 45 in a state of being spaced from each other, and are guided to the strand drawing unit 29 by converting the moving track to the horizontal direction. At this time, the strand 1 drawn out downstream of the resin bath unit 13 is rotated around the axis by the twisting unit 17. Accordingly, the fiber bundles 5 move from the introduction roller 45 toward the strand drawing unit 29 and are twisted together from the state of being spaced apart from each other.

The twisted fiber bundles 5 are collected in a center portion of the opening 57 of the die 55, and accordingly, an outer periphery of the twisted fiber bundles 5 is uniformly covered with the thermoplastic resin R in the circumferential direction. Therefore, the strand 1 is drawn out from the opening 57 of the die 55. In the strand 1, the periphery of the twisted fiber bundles 5 is uniformly covered with the base material 3 made of the thermoplastic resin R, and there is no exposure from the outer periphery of the fibers 7 constituting the fiber bundle 5 (see FIG. 3).

When the strand 1 is drawn out from the opening 57 of the die 55, the groove portions 9 are formed on the outer peripheral surface of the strand 1 by the groove forming protrusions 59 of the opening 57 of the die 55. At this time, the strand 1 is rotated around the axis by the twisting unit 17, so that the groove portions 9 on the outer peripheral surface are each formed in a spiral shape. As described later, a die without the groove forming protrusions 59 may be used. In this case, the groove portions 9 are formed in the base material 3 by twisting the strand 1 itself.

(3) Cooling Step

The cooling step is a step of cooling the strand 1 by the cooling unit 15. In the cooling step, the strand 1 drawn out from the strand drawing unit 29 of the resin bath unit 13 is drawn into the cooling tank 31 of the cooling unit 15 and then drawn out. Accordingly, the thermoplastic resin R serving as the base material 3 of the strand 1 is cooled and cured by the cooling water W stored in the cooling tank 31.

(4) Winding Step

The winding step is a step of winding up the strand 1 by the twisting unit 17. In the winding step, the strand 1 cooled by the cooling unit 15 is drawn into the case 39 by the draw-in rollers 35 of the twisting unit 17, and is wound around the winding bobbin 37 in the case 39.

As described above, in the production apparatus 100, the spiral groove portion 9 is formed on the outer peripheral surface by the above-described steps, and the strand 1 excellent in the bendability can be easily produced.

The structure of the strand 1 is not limited to the above embodiment. For example, the strand 1 having three fiber bundles 5 is exemplified in the above-described embodiment, and the number of the fiber bundles 5 is not limited to three. In addition, after producing the strand 1 having a circular cross-sectional shape, the spiral groove portions 9 may be formed on the outer peripheral surface of the strand 1 by cutting or the like.

Hereinafter, strands having other structures will be described.

Figure 4:
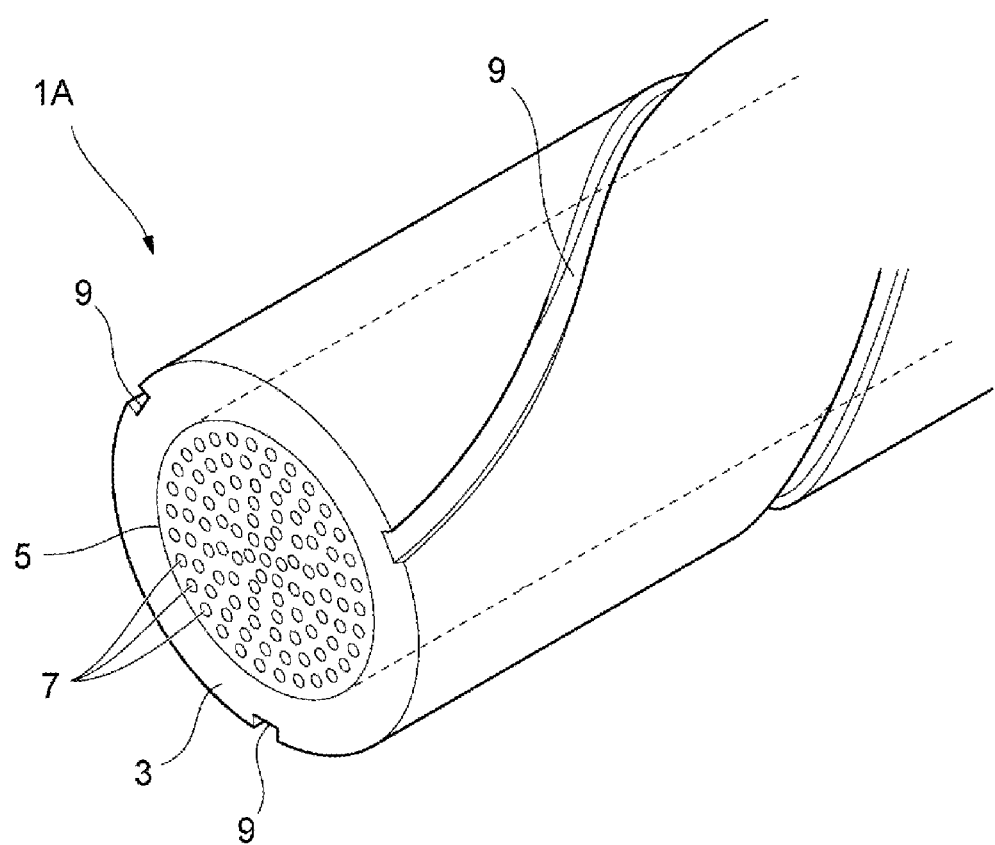
FIG. 4 is a perspective view of a strand having another structure.

FIG. 4 to are perspective views of strands having other structures.

A strand 1A shown in FIG. 4 includes a fiber bundle 5 obtained by bundling the fibers 7. The fiber bundle 5 is provided at a center of the base material 3 and extends along the axial direction while rotating along the groove portions 9. Similar to the strand 1, an outer periphery of the base material 3 and thus an outer peripheral surface of the strand 1A, excluding the part that is the groove portions 9, are formed in a substantially circular shape in a cross section perpendicular to the axial direction. That is, the fiber bundle 5 is provided in a concentric circular region with respect to the outer peripheral surface of the strand 1A.

Figure 5:
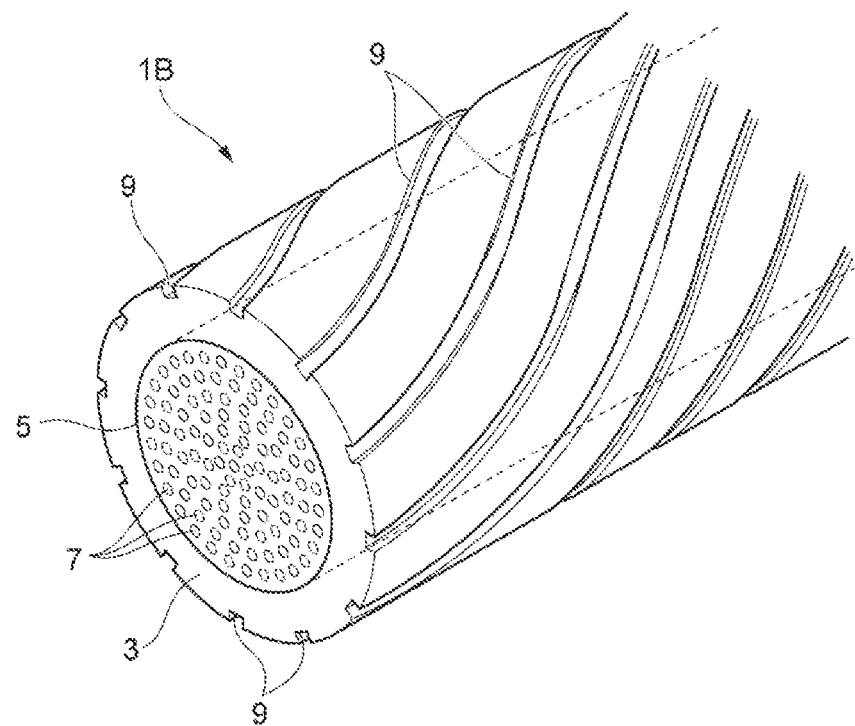
FIG. 5 is a perspective view of a strand having another structure.

A strand 1B shown in FIG. 5 is obtained by reducing the width dimension in the circumferential direction of each of the groove portions 9 of the strand 1A shown in FIG. 4 and increasing the number of the groove portions 9 thereof. By narrowing the arrangement pitch in the circumferential direction of the groove portions 9, the bendability of the strand 1B is improved, and the bending resistance can be made uniform regardless of the bending direction.

Figure 6:
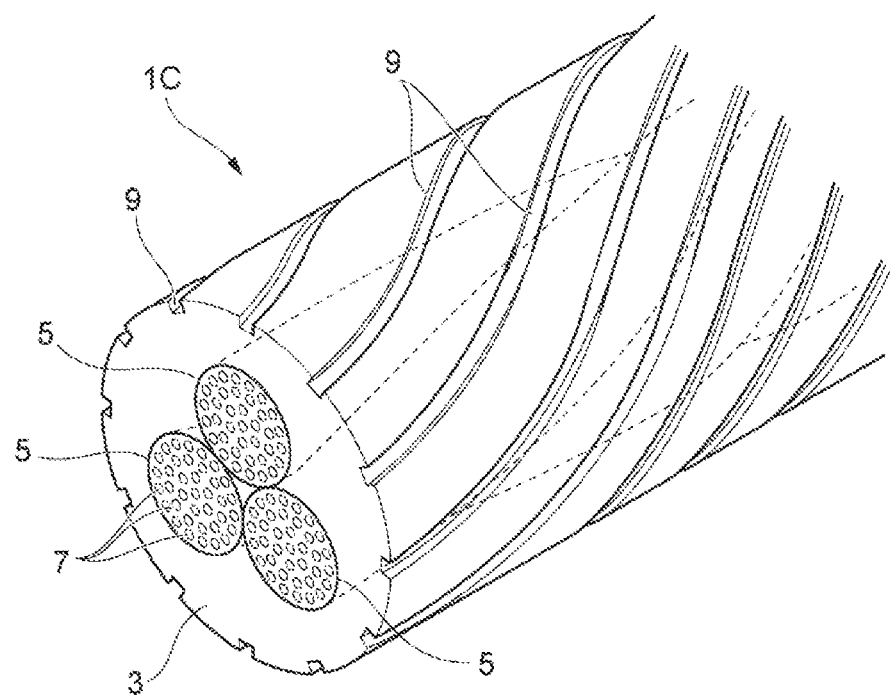
FIG. 6 is a perspective view of a strand having another structure.

A strand 1C shown in FIG. 6 is obtained by changing the fiber bundle 5 of the strand 1B shown in FIG. 5 to three (plural) fiber bundles 5. The fiber bundles 5 are respectively arranged at positions where a center of the strand 1B is a center of point symmetry. In this case, the uniformity of the bendability and the bending resistance of the strand 1C is also improved. In this case, due to the reason that the base material 3 is relatively hard or the like, the groove portions 9 can be reliably formed even in a case where the groove portion is hardly formed due to twisting, like a strand 1D of FIG. 7 described later.

Figure 7:
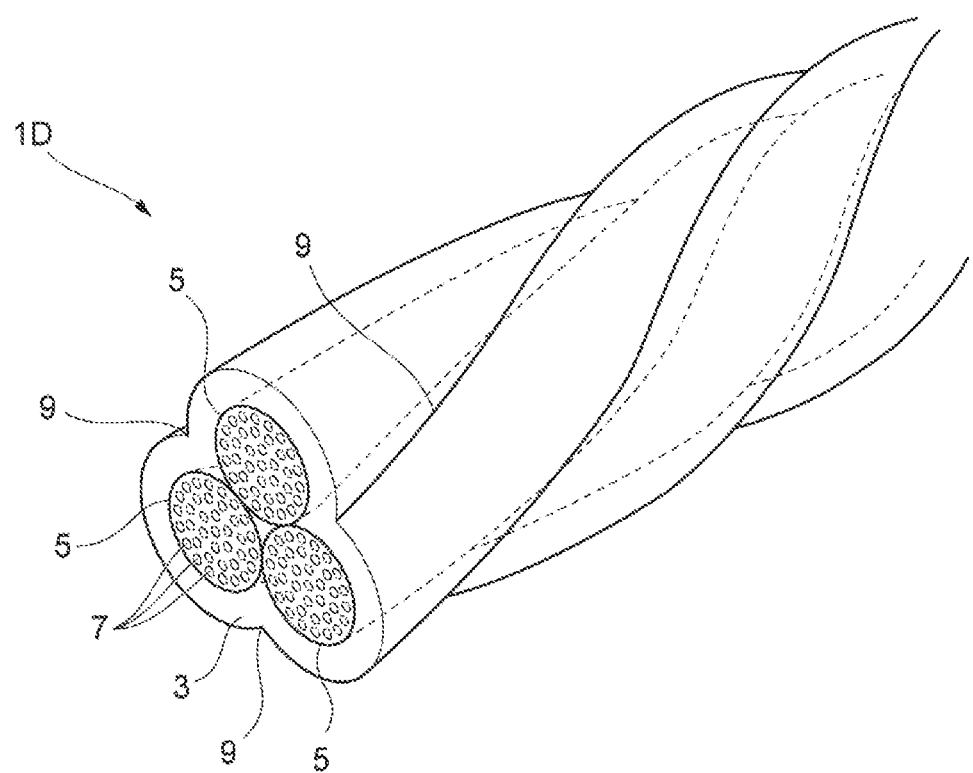
FIG. 7 is a perspective view of a strand having another structure.

The strand 1D shown in FIG. 7 is a strand produced using three (plural) fiber bundles 5. In this case, a die without the groove forming protrusion 59 is used for producing the strand 1D. In the strand 1D, the groove portions 9 are formed by twisting the strand 1D itself, and finally twisting three (plural) fiber bundles 5 themselves. Therefore, in the strand 1D, the groove portions 9 formed on the outer peripheral surface are each recessed in a V-shape not a recessed shape. The groove portions 9 are also each formed in a spiral shape, and an inner surface thereof is formed to be smoothly connected to an outer peripheral surface of the strand 1D. In this case, since the groove portions 9 are formed by twisting the fiber bundles 5 themselves, it is not necessary to separately process the groove portions 9, and the production process can be simplified.

Figure 8:
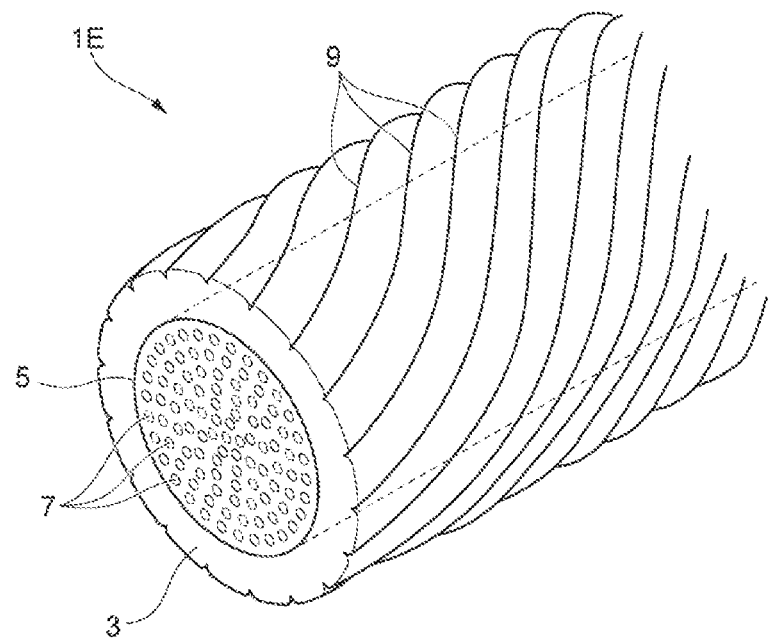
FIG. 8 is a perspective view of a strand having another structure.
Figure 9:
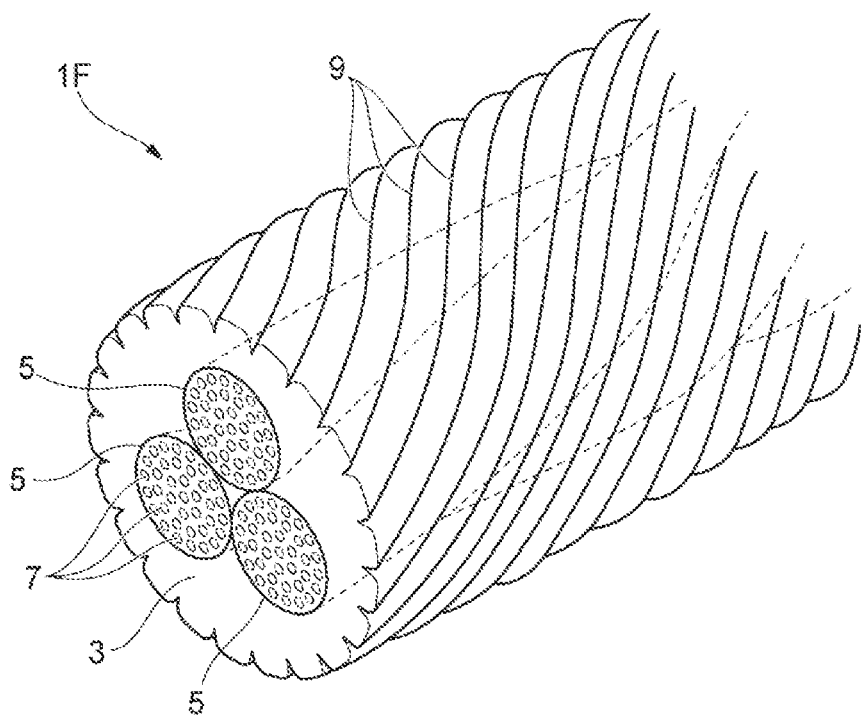
FIG. 9 is a perspective view of a strand having another structure.

As other examples in which a groove portion is formed by twisting a strand itself, finally twisting a fiber bundle itself using a die without the groove forming protrusions 59, a strand 1E in FIG. 8 and a strand 1F in FIG. 9 are shown.

The strand 1E shown in FIG. 8 contains a single fiber bundle 5. In the strand 1E, the groove portions 9 are formed by twisting the strand 1E itself, finally twisting the single fiber bundle 5 itself contained therein. The fiber bundle 5 in this case is provided at a center of the base material 3 and extends along the axial direction while rotating along the groove portions 9.

The strand 1F shown in FIG. 9 contains the fiber bundles 5, and is the same as the strand 1E shown in FIG. 8 in the configuration. However, the strand 1F has more twists than the strand 1F (the pitch of the spiral is smaller). Therefore, the depth of the groove portion 9 is larger in the strand 1F than in the strand 1E. Accordingly, a cross section of the strand 1D shown in FIG. 7 has an irregular shape in which three circles are combined, and in contrast, a cross section of the strand 1F is formed in a shape closer to a circle.

Figure 10:
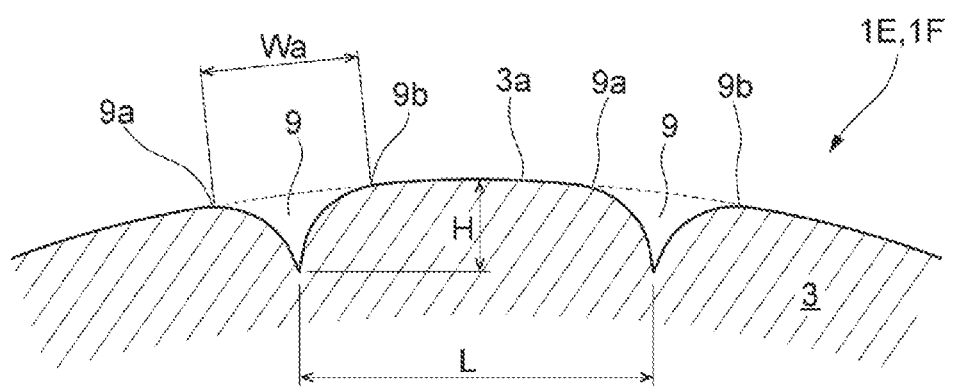
FIG. 10 is a schematic cross-sectional view showing an enlarged part of an outer peripheral surface of the strand.

FIG. 10 is a schematic cross-sectional view showing a partially enlarged shape of a cross section perpendicular to the axial direction of each of the strands 1E and 1F respectively shown in FIGS. 8 and 9. It should be noted that FIG. 10 schematically shows the groove portions 9, and that a depth dimension H of the groove portion 9, a width dimension Wa of the groove portion 9, and a circumferential interval L between the groove portions 9 are an example.

An outer peripheral surface of the strand (the outer peripheral surface 3a of the base material 3) shown in FIG. 10, excluding a region between the circumferential end portions 9a and 9b of the same groove portion 9, is formed to have a substantially circular cross-sectional shape, similar to the strand 1. The substantially circular shape herein means a circular shape or a shape close to a circular shape and specifically refers to a shape formed with arcs of the same circle by a part of outer peripheral edges of the cross section perpendicular to the axial direction of the strand 1 excluding the region of the groove portion 9. The arcs may not necessarily be an arc of the same circle, and each of the arcs may be arranged in a manner of including a specific radial position from the center of the strand 1. Alternatively, a circle circumscribing each arc may be concentric with the center of the strand 1. Regarding the shapes of the outer peripheral surfaces of the above strands excluding the groove portion 9, the same applies to the strand 1 shown in FIGS. 1A and 1B, and the strands 1A, 1B, and 1C respectively shown in FIGS. 4 to 6.

Figure 11:
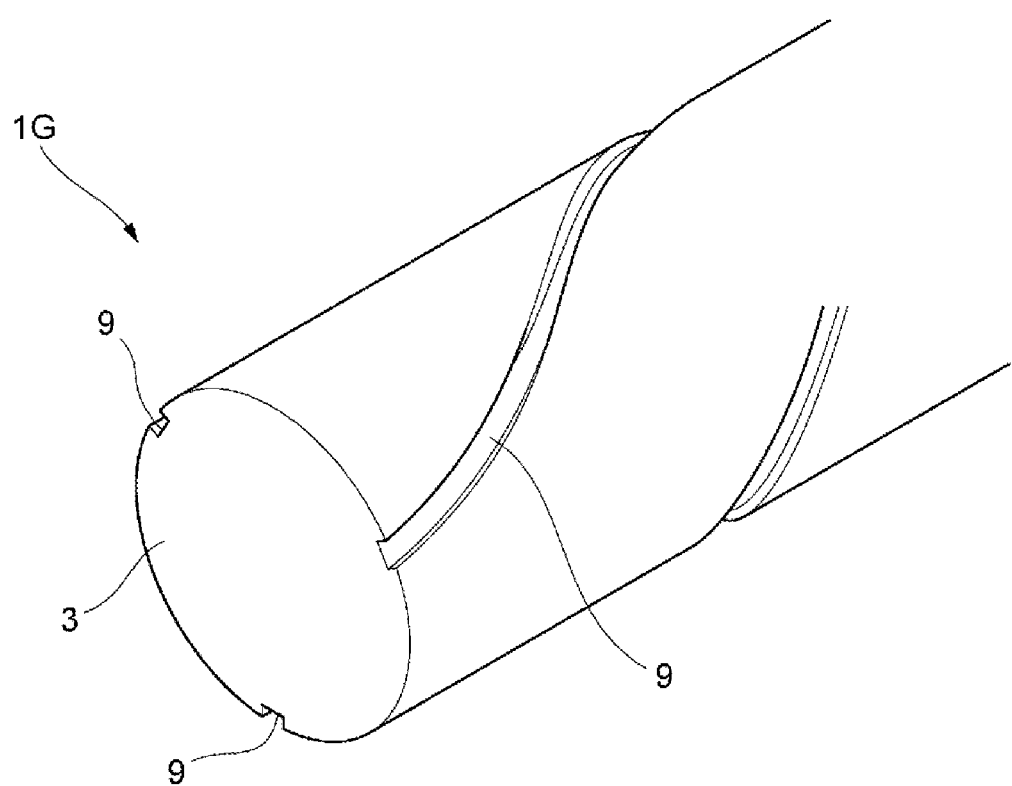
FIG. 11 is a perspective view of a strand having another structure.
Figure 12:
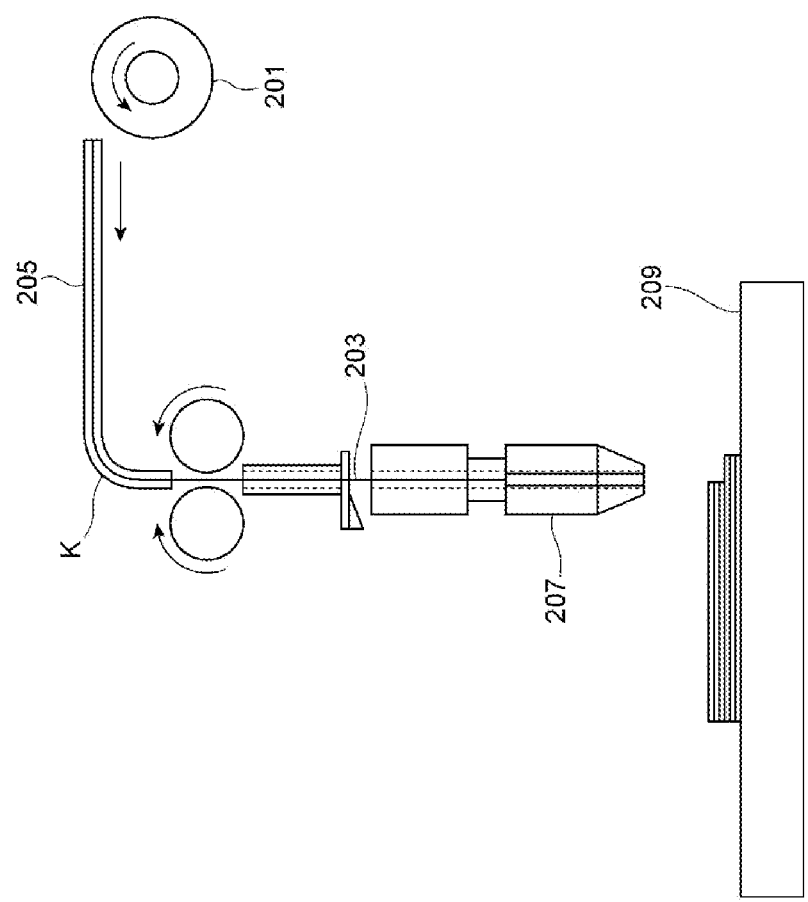
FIG. 12 is a schematic configuration diagram of a 3D punter using resin strands.

A strand 1G shown in FIG. 11 does not have the fiber bundles 5, and includes only the base material 3 made of a thermoplastic resin. In this case, an outer periphery of the base material 3 and thus an outer peripheral surface of the strand 1G, excluding the part that is the groove portions 9, are also formed in a substantially circular shape in the cross section perpendicular to the axial direction as described above.

In all the strands 1A, 1B, 1C, 1D, 1E, 1F, and 1G described above, the spiral groove portions 9 are formed along the axial direction on the outer peripheral surface. Therefore, the surface area of the outer peripheral surface can be increased, and the bendability can be improved. Regarding any strand, in order to ensure sufficient strength of the manufactured object, the fiber volume content which is a ratio of the fiber to the entire strand is preferably 5% or more and 85% or less.

As described above, the present invention is not limited to the above-described embodiments, and combinations of the respective configurations of the embodiments and changes and applications made by those skilled in the art based on the description of the specification and well-known techniques are also intended for the present invention and are included in the scope of protection.

As described above, the present specification discloses the following matters.

(1) A strand, which is a resin strand used as an additive manufacturing raw material for a 3D printer and formed in a linear shape,
the strand including a spiral groove portion formed on an outer peripheral surface along an axial direction.

According to the strand, the spiral groove portion is formed on the outer peripheral surface along the axial direction, so that the front surface area of the outer peripheral surface can be increased, and the bendability can be improved.

Accordingly, when the strand is fed from the spool to the nozzle in the 3D printer, even if a bending force is applied to the strand at the bent portion since the supply path has the bent portion, the strand can be fed along the bent supply path without being cracked or damaged. Therefore, the manufacturing using the 3D printer can be smoothly performed. In addition, the strand can be easily wound around the spool without being cracked or damaged.

(2) The strand according to (1), in which the groove portions formed in spiral shapes in the same direction and at the same pitch are formed at equal intervals in a circumferential direction in a cross section perpendicular to the axial direction.

According to the strand, the spiral groove portions are formed, so that the bendability can be further improved. Further, the groove portions are formed at equal intervals in the circumferential direction in a cross-sectional view, and the spirals of the groove portions are in the same direction and at the same pitch. Therefore, bendability can be improved in all directions in a balanced manner.

(3) The strand according to (1) or (2), including fibers or fiber bundles along the axial direction.

According to the strand, the strength can be greatly increased by the fibers or the fiber bundles. In addition, the strand is hardly bent when containing the fibers or the fiber bundles, but good bendability can be ensured by the spiral groove portions formed on the outer peripheral surface. Accordingly, even when a manufactured object is formed using the fused deposition modeling 3D printer, manufacturing can be performed while favorably bending the strand, deterioration in manufacturing accuracy of the manufactured object and quality deterioration due to generation of voids in the manufactured object can be prevented, and a high-quality manufactured object can be formed.

(4) The strand according to (3), in which the fibers or the fiber bundles are twisted together.

According to the strand, the fibers or the fiber bundles are twisted together, so that the bendability of the fibers or the fiber bundles themselves can be enhanced, and the deterioration in the bendability due to the contained fibers or the fiber bundles can be prevented.

(5) The strand according to any one of (1) to (4), in which a part of outer peripheral edges of the cross section perpendicular to the axial direction of the strand excluding a region of the portion is formed by arcs of the same circle.

According to the strand, the outer peripheral edges of the cross section are formed by the arcs of the same circle, and the outer peripheral surface is formed in a substantially circular shape as a whole. Therefore, when a manufactured object is formed by, for example, a 3D printer, the supply amount of the strand can be made constant, and the quality of the manufactured object can be stabilized.

The present application is based on Japanese Patent Application No. 2020-185914 filed on Nov. 6, 2020 and Japanese Patent Application No. 2021-148158 filed on Sep. 10, 2021, the contents of which are incorporated herein by reference.

REFERENCE SIGNS LIST 5 fiber bundle
7 fiber
9 groove portion

The invention claimed is:

1. A strand for an additive manufacturing raw material for a 3D printer and formed in a linear shape, the strand comprising:
    a base material comprising a thermoplastic resin, and
    fiber bundles formed by bundling fibers, the fiber bundles continuously extending in an axial direction and being disposed at a center of the base material, wherein
    the fibers in each of the fiber bundles are twisted together,
    the thermoplastic resin is impregnated between the fibers,
    an outer periphery of the fiber bundles is covered with the thermoplastic resin in a circumferential direction,
    the strand comprises a spiral groove portion formed on an outer peripheral surface of the thermoplastic resin along the axial direction,
    the spiral groove portion has a width dimension of 0.001 mm to 10 mm and a depth dimension of 0.001 mm to 10 mm,
    the spiral groove portion includes a predetermined number of spiral groove portions, and
    the number of spiral groove portions is greater than a number of the fiber bundles.

2. The strand according to claim 1,
    wherein the groove portions formed in spiral shapes in the same direction and at the same pitch are formed at equal intervals in a circumferential direction in a cross section perpendicular to the axial direction.

3. The strand according to claim 1,
    wherein a part of outer peripheral edges of the cross section perpendicular to the axial direction of the strand excluding a region of the groove portion is formed by arcs of the same circle.

4. The strand according to claim 2,
    wherein a part of outer peripheral edges of the cross section perpendicular to the axial direction of the strand excluding a region of the groove portion is formed by arcs of the same circle.

5. A strand for an additive manufacturing raw material for a 3D printer and formed in a linear shape, the strand comprising:
    a base material comprising a thermoplastic resin,
    a single fiber bundle formed by bundling fibers, the single fiber bundle continuously extending in an axial direction and being disposed at a center of the base material, wherein
    the fibers of the single fiber bundle are twisted together,
    the thermoplastic resin is impregnated between the fibers,
    an outer periphery of the single fiber bundle is covered with the thermoplastic resin in a circumferential direction,
    the strand comprises a spiral groove portion formed on an outer peripheral surface of the thermoplastic resin along the axial direction,
    the spiral groove portion has a width dimension of 0.001 mm to 10 mm and a depth dimension of 0.001 mm to 10 mm,
    the spiral groove portion includes a predetermined number of spiral groove portions, and
    the number of spiral groove portions is greater than a number of the fiber bundles.

6. The strand according to claim 5,
    wherein the groove portions formed in spiral shapes in the same direction and at the same pitch are formed at equal intervals in a circumferential direction in a cross section perpendicular to the axial direction.

7. The strand according to claim 5,
    wherein a part of outer peripheral edges of the cross section perpendicular to the axial direction of the strand excluding a region of the groove portion is formed by arcs of the same circle.

8. The strand according to claim 6,
    wherein a part of outer peripheral edges of the cross section perpendicular to the axial direction of the strand excluding a region of the groove portion is formed by arcs of the same circle.

9. The strand according to claim 1, wherein the width dimension is greater than or equal to 0.005 mm and less than or equal to 5 mm.

10. The strand according to claim 1, wherein the depth dimension is greater than or equal to 0.005 mm and less than or equal to 1 mm.

* * * * *